United States Patent [19]

Larionov et al.

[11] 3,870,850

[45] Mar. 11, 1975

[54] METHOD OF CONNECTING ELECTRICALLY CONDUCTING BODIES

[76] Inventors: Igor Naumovich Larionov, Kalanchevskaya ulitsa 11, kv. 65, Moscow; Tom Pavlovich Chernetsky, ulitsa Kommunisticheskaya, 7, kv. 191, Ramoskoe, Moskovskoi oblasti, both of U.S.S.R.

[22] Filed: Apr. 27, 1973

[21] Appl. No.: 355,293

Related U.S. Application Data

[63] Continuation of Ser. No. 228,652, Feb. 23, 1972, abandoned.

[52] U.S. Cl. .................... 219/85, 29/569, 148/1.5
[51] Int. Cl. ............................................. B23k 1/04
[58] Field of Search .............. 219/85; 148/1.5, 186; 29/569, 584, 586, 589, 590

[56] References Cited
UNITED STATES PATENTS

| | | | |
|---|---|---|---|
| 3,301,716 | 1/1967 | Kleinknecht | 148/1.5 |
| 3,374,530 | 3/1968 | Flanders et al. | 29/484 |
| 3,660,632 | 5/1972 | Leindram | 219/85 |

*Primary Examiner*—C. L. Albritton
*Attorney, Agent, or Firm*—Holman & Stern

[57] ABSTRACT

A method of joining electrically conducting bodies based on the introduction of a low-melting material in a molten state into a gap between the two bodies to be connected, dissolving the surface layers of the bodies to be joined in the melt of the low-melting material, subsequent crystallization of the surface layers and removal of the molten low-melting material from the gap between the bodies being connected, with said crystallization and removal of the molten low-melting material being effected by passing D.C. current through the bodies to be connected while the low-melting material is maintained in its hot molten state.

3 Claims, 4 Drawing Figures

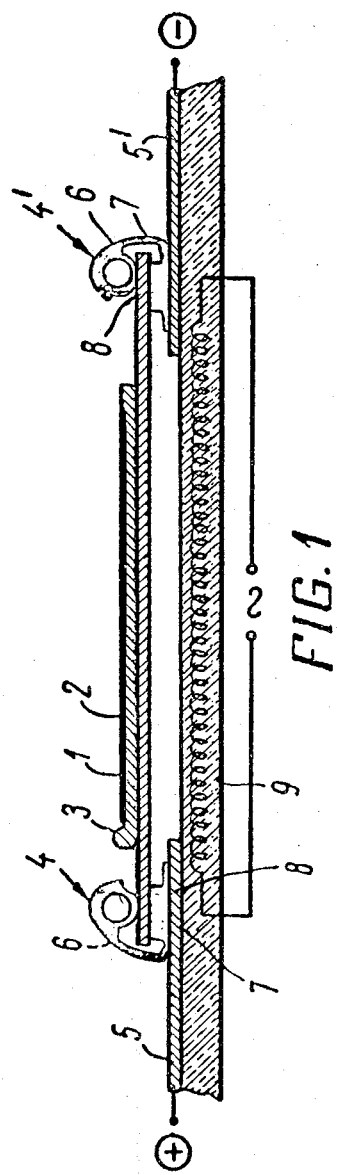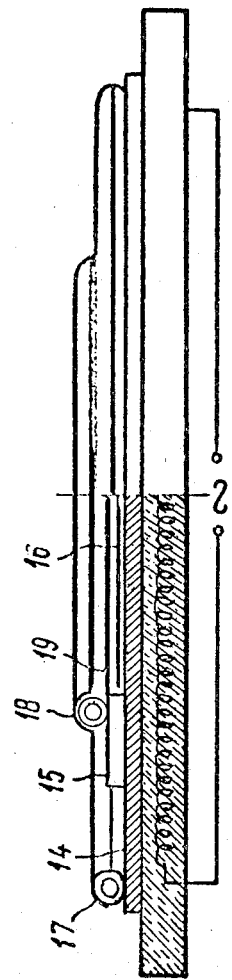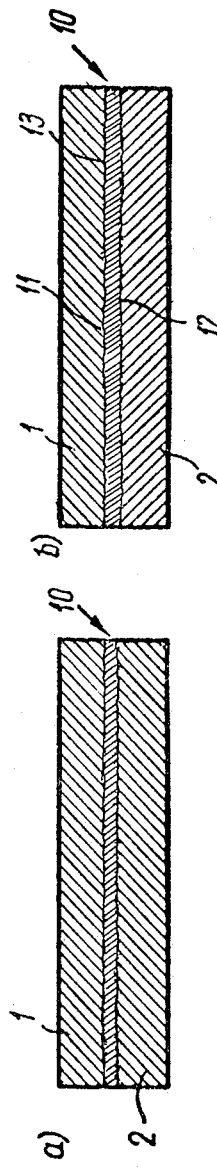

METHOD OF CONNECTING ELECTRICALLY CONDUCTING BODIES

This is a continuation of application Ser. No. 228,652, filed Feb. 23, 1972, now abandoned.

BACKGROUND OF THE INVENTION

1. Field of the Invention

The present invention relates to methods for connecting electrically conducting bodies and, more particularly, to semiconductor single crystals or metals employed in the fabrication of semiconductor and electron-tube devices.

2. Description of the Prior Art

Known in the prior art is a method of joining electrically conducting bodies, based on the introduction of a low-melting material in the molten state into a gap between the two bodies to be joined; dissolving the surface layers of the bodies to be connected in the melt of the low-melting material, subsequent crystallization of the surface layers and removal of the molten low-melting material from the gap between the bodies being joined (see, for example, U.S. Pat. No. 3,301,716, Cl. 148-1.5).

According to the above technique, the bodies to be connected are placed into a furnace with a temperature gradient directed in parallel with the plane of juncture of the bodies being joined.

With the temperature gradient directed parallel to the plane of juncture of the bodies being connected the low-melting material in the fluid hot state will move in the gap between the two bodies to be connected in a direction of the heated faces of the bodies being connected. As a result of this movement the low-melting material will accumulate on the heated faces of the bodies being joined.

However, the above described prior art method of connecting bodies owing to the movement of molten low-melting material in the gap between the bodies, which is effected under the influence of a temperature gradient directed parallel to the plane of juncture of the bodies to be connected suffers from several drawbacks which limit the potential uses of this method.

Thus, peculiar to a connecting layer between the bodies being connected produced by using the foregoing technique are variable thickness (with thickening directed towards more heated faces of the bodies) and varying chemical composition. This is associated with the fact that crystallization of surface layers of the material of the bodies being joined occurs at different temperatures.

In the event the bodies to be joined are of sufficiently large linear dimensions the use of the aforesaid method presents a problem, since it is necessary to maintain an adequately high temperature gradient.

SUMMARY OF THE INVENTION

It is an object of the present invention to provide a method for connecting electrically conducting bodies, which enables joining contact surfaces of the bodies so that a thin connecting or intermediate layer will feature constant thickness, uniform chemical composition and constant physical properties.

Another object of this invention is to work out a method for connecting electrically conducting bodies which enables the connection of the bodies of sufficiently large linear dimensions and those with contact surfaces of intricate geometry.

Still another object of the present invention consists in devising a method for connecting electrically conducting bodies which enables the production of bicrystals with an alloyed connecting layer therebetween, the contact boundary between the two single crystals (bicrystalline boundary) lying within that layer, there being a possibility of building-up a p-n junction of the boundary of the crystallized layer.

The essence of this invention consists in that in a method for connecting electrically conducting bodies based on the introduction of a low-melting material in the hot fluid state into a gap between the bodies being joined, dissolving surface layers of the material of the bodies to be connected in the melt of the low-melting material, subsequent crystallization of the surface layers and removal of the molten low-melting material from the gap between the bodies being connected, conforming to the present invention, crystallization of the surface layers of the materials of the bodies to be joined and the removal of the molten low-melting material filling the gap between the bodies to be joined are effected by passing D.C. current through the bodies being connected and the melt of the low-melting material.

It would be expedient to pass D.C. current through the bodies to be connected and the melt of the low-melting material in such a way that the current density vector will be tangential to the plane of juncture of the bodies being connected.

The proposed method of connecting electrically conducting bodies is technically expedient as it ensures high-quality joints in the entire joint area. Besides, the joining operation is of short duration (in the examples quoted below the joining time does not exceed one hour).

The method of this invention is suitable for connecting bodies of same or different materials. However, when accomplishing such connections bodies, with close thermal-expansion coefficients shall be selected. It is also possible by the method of the invention to connect bodies that do not posses adequate electric conductivity at room temperature but are conductors at adequately high temperatures.

It would be sound practice to employ the proposed method for connecting bodies of high-melting materials at a temperature well below the melting point of the bodies being connected. The intermediate connecting layer retains its strength at a temperature in excess of that at which joining has been accomplished.

In addition it would be expedient to use the method described herein for the manufacture of semiconductor devices, for instance, for joining two semiconductor plates with the building-up of p-n junctions.

The proposed method of joining electrically conducting bodies is accomplished as follows.

BRIEF DESCRIPTION OF THE DRAWING

The nature of the present invention will become more fully apparent from a consideration of the following description of exemplary embodiments thereof taken in conjunction with the accompanying drawings, in which:

FIG. 1 is a principal layout in longitudinal section showing the manner of connection of electrically conducting bodies in the form of rectangular plates by the method of this invention;

FIGS. 2a and 2b illustrate respectively in cross-section a joint between two polycrystalline and single-crystalline bodies produced in compliance with the proposed method;

FIG. 3 is a schematic showing the connection of electrically conducting bodies having the form of a disc and a washer (a general view with a fragmentary cut-away).

The essence of this invention lies in that by passing D.C. current through the bodies to be joined and the low-melting material in the hot fluid state, the molten low-melting material is introduced into a gap between the two bodies being connected and the surface layers of the materials of the bodies to be joined are dissolved in the melt ensuring removal of the low-melting material from the gap between the bodies being connected and effecting crystallization of the dissolved material in the gap separating the bodies to be joined to form a joint therebetween.

The material transfer under the influence of electric current is due to dissolving thin surface layers of the material adjacent to the contact surfaces of the bodies being connected by virtue of electric diffusion of materials through the volume of molten material and subsequent crystallization of this material in the form of thin layers adjoining the contact surfaces of the bodies being connected.

The crystallized layer is doped with admixtures transferred from a molten zone and features constant thickness and uniform and invariable chemical composition owing to the fact that both the solution of the material of the bodies being connected in the melt and its crystallization as the melt emerges from the gap between the bodies being connected occur under similar thermal conditions; also the temperature and current density in the gap between the bodies to be joined is kept constant.

When connecting electrically conducting bodies by the above method it is expedient as stated before to pass D.C. current through the bodies being connected and through the layer of low-melting material in a manner such that the current density vector shall be parallel to the plane of juncture of the bodies being connected. If the surface of the bodies being connected is curvilinear it would be sound practice to direct the current density vector tangentially to the plane of juncture.

Better conductivity of the low-melting material as compared to the material of the bodies to be connected favors the joining in conformity with the above procedure, since in this case the current density within the gap between the bodies being connected is higher. This is particularly true in connecting bodies of semiconductor materials, such as germanium, silicon, silicon carbide, gallium arsenide, and of low-melting materials, such as indium, gallium, tin and low-melting eutectics (for instance aluminium-silicon, aluminium-germanium, silicon-gold).

According to the above method the joining of two bodies in the form of reactangular plates 1 and 2 (FIG. 1) is effected by bringing them into contact. (In the example illustrated, the top plate 1 is shorter than plate 2). Placed on the left-hand face (with respect to the plane of the drawing) of plate 2 is low-melting material 3 in the form of a globule so that it touches the left-hand face (also with respect to the drawing plane) of plate 1. Faces of plate 2 bear electrical sliding contacts 4 and 4'.

Electric current is distributed over the cross-section of plates 1 and 2 being connected, with the aid of electrical sliding contacts 4 and 4'. To this end contacts 4 and 4' are capable of being rigidly fixed at will on the faces of plate 2 and also capable of freely sliding over current-carrying contacts 5 and 5', which precludes the occurence of thermal stresses. In order to ensure uniform distribution of electric current, contacts 4 and 4' are fitted with a coiled spring 6 made of high-melting material, e.g. molybdenum or tantalum, and fixed with clamp 7 also of high-melting material. Each turn of spring 6 touches plate 2.

To rule out concentration of current and Voltaic arc, clamp 7 and plate 2 are separated with insulating lining-quartz sheet 8.

Plates 1 and 2 to be connected together with electrical sliding contacts 4 and 4' are arranged on their faces and placed into a working chamber (not shown in the drawing) which is either evacuated or filled with a protective atmosphere — argon or hydrogen. Then the plates are heated with the aid of heater 9 to a melting point of low-melting material 3, whereupon a constant voltage is applied to current-carrying contacts 5 and 5' which results in a flow of electric current through the contacts and plates 1 and 2 to be connected. The direction of electric current is so selected that molten material from globule 3 will move over the surface of bottom plate 2 towards the right-hand (with respect to the plane of the drawing) face of top plate 1.

On reaching the gap, molten material from globule 3 is entrained into the gap by capillary forces thereby dissolving the surface layers of plates 1 and 2 being connected. Under the influence of electric current the material of bottom plate 2 dissolves beneath the right-hand face of top plate 1. On being transferred by electric diffusion into the gap zone the material crystallizes there. The gap is filled with the crystallized material and molten material from globule 3 escapes completely from the gap and appears on the surface of the bottom plate 2 where it accumulates at contact 4'. As a result plates 1 and 2 are separated with thin intermediate (connecting) crystalline layer 10 (FIG. 2a), featuring constant thickness and uniform chemical composition.

Connecting layer 10 consists of the material of the bodies being joined with small additions of low-melting material 3. In joining polycrystalline bodies the intermediate connecting layer 10 has a polycrystalline structure, as shown in FIG. 2a.

In joining single-crystalline bodies connecting layer 10 (FIG. 2b) is made up of two single-crystalline parts 11 and 12 separated with bicrystalline boundary layer 13.

The method proposed herein makes it possible to vary the thickness of connecting layer 10 by changing the temperature and density of electric current. By raising the temperature and decreasing the current density it is possible to increase the thickness of intermediate connecting layer 10, whereas a drop in temperature and a rise in current density results accordingly in a decrease in thickness of layer 10.

To make the present invention more clear quoted below are the following examples of joining electrically conducting bodies.

EXAMPLE 1

The method of this invention is illustrated with an example which considers the joining of electrically conducting bodies in the form of rectangular plates 1 and 2 (FIG. 1) produced of germanium.

Plate surface is ground and polished by using a paste of diamond micropowder, washed off in boiling trichlorethylene, then it is cleaned in boiling 5% (by weight) aqueous solution of potassium hydroxide and finally in bidistilled water.

Specific resistance of plate 1 is 1 ohm.cm and it measures $25 \times 25 \times 0.2$ mm$^3$; plate 2 is of 0.001 ohm.cm specific resistance and measures $32 \times 25 \times 0.2$ mm$^3$.

Secured on the faces of plate 2 are electrical sliding contacts 4 and 4' touching current-carrying contacts 5 and 5'. On top of plate 2 is arranged plate 1.

At the left-hand face of plate 1 is set up a ball or globule 1 mm diameter of low-melting material 3, in this case it is indium.

Plates 1 and 2 to be joined with contacts 4, 4' and 5, 5' are arranged in a working chamber (not shown in the drawing), filled with a protective atmosphere — hydrogen with a dew point of −60° C. Current-carrying contact 5 is connected with a positive pole of a D.C. current supply source and contact 5' with a negative pole.

Plates 1 and 2 are heated by heater 9 to a 600° C temperature whereupon a 10 A. D.C. current is passed through them. In the central portion of plates 1 and 2 to be connected, the density current vector is directed in parallel with the contact surface.

After indium in the hot fluid state emerges under the right-hand face of plate 1 which occurs in 3–4 min. after the voltage has been supplied, current is cut out and temperature decreased to ambient level.

Between plates 1 and 2 is formed intermediate connecting layer 10 shown in FIG. 2b. Layer 10 is about 2 μ thick and is made up of two single-crystalline parts 11 and 12 of germanium separated with bicrystalline boundary layer 13. The layers are alloyed with indium.

The surface of the bodies to be joined is inspected for non-connected surface zones and metal inclusions by X-ray electron-miscroscopy and optical methods. Provided the surface of plates 1 and 2 to be connected is thoroughly treated and cleaned from dirt the joint produced is uniform throughout the area of juncture and is free from voids and metal inclusions.

EXAMPLE 2

The method of the invention is expounded by considering the process of joining electrically conducting bodies in the form of disc 14 (FIG. 3) and washer 15, made from germanium.

Disc 14 is cut of germanium featuring the n-type conductivity and a 30 ohm.cm specific resistance. The surface of disc 14 is subjected first to grinding and then to polishing with the aid of a paste of diamond micropowder. Washer 15 is cut out of germanium alloyed with arsenic, possessing a 0.001 ohm.cm specific resistance. Final dimensions of washer 15 are: 0.2 mm thick and 18 mm inner dia, 26 mm outer dia and 0.4 mm thick. Disc 14 is 34 mm in diameter and 0.2 mm in thickness. The surfaces of both disc 14 and the washer 15 cleaned free of dirt by using the same procedure as for the plates of Example 1.

On being arranged coaxially on heater 16, set up in a working chamber (not shown in the drawing) disc 14 and washer 15 are brought into contact accordingly with ring-type contacts 17 and 18. Then ring-type contact 17 is connected with a positive pole of a D.C. current supply source (not shown in the drawing) and contact 18 with its negative pole.

Placed on the surface of disc 14 is ring 19 of a low-melting material, preferably tin, to which small amounts (0.5% by weight) of arsenic are added. Ring 19 is 0.1 mm thick, 17.6 mm in outer dia and 17.0 mm in inner dia. The chamber is filled with a protective atmosphere — hydrogen with a dew point of −60° C. Next, disc 14 and washer 15 are heated with the aid of heater 16 to a 600° C temperature whereupon a 8 amperes D.C. is passed in the radial direction from disc 14 to washer 15. Tin melts and enters the gap between disc 14 and washer 15. Within 7–8 min. of passing current tin comes out completely from the gap and accumulates at contact 17. The gap between washer 15 and disc 14 is filled with an intermediate connecting crystalline layer containing germanium with arsenic and tin additions.

Quality of the joint produced is checked similarly to Example 1.

EXAMPLE 3

The method of the invention is illustrated by considering the joining of the conductors of electricity in the form of rectangular plates 1 and 2 in silicon with a p-n junction with reference to FIGS. 1 and 2b.

Prior to connecting, the surface of both plates is ground and polished by using a paste of diamond micropowder, then it is washed in boiling strong nitric acid. Directly before the joining operation the plates are subjected to washing in strong hydrofluoric acid and then in bidistilled water.

Plate 2 (FIG. 1) made of silicon with the p-type conductivity measuring $32 \times 25 \times 0.2$ mm$^3$ and with a 0.01 ohm.cm specific resistance is mounted on heater 9 set up in the working chamber (not shown in the drawing) which is evacuated. Connected to the faces of plate 2 are electrical sliding contacts 4 and 4'. On top of plate 2 is set plate 1 made of silicon with the n-type conductivity and a 30 ohm.cm specific resistance. As to low-melting material 3, use is made of silumin of an eutectic composition and in the form of a ball 0.8 mm in diameter.

Connected to current-carrying contact 5 is a positive pole of the D.C. current supply source and to contact 5' its negative pole.

The process of joining plates 1 and 2 is effected, as stated above, in vacuum at a residual pressure of about $1 \cdot 10^{-7}$ mm Hg. Plates 1 and 2 are heated with the aid of a heater 9 up to a 800° C temperature after which 6 amperes D.C. current is allowed to flow through them. Plates 1 and 2 having been heated, silumin melts and under the influence of electric current enters the gap between plates 1 and 2, as described in Example 1. Within 4–5 min. silumin emerges from the righthand face of top plate 1 the instant since D.C. starts flowing in.

As a result crystallized connecting layer 10 (FIG. 2b) is formed between plates 1 and 2, the layer consisting of silicon alloyed with an addition of aluminium. The layer is about 1 μ thick. Build-up on the boundary between crystallized layer 10 and plate 1 is a p-n junction with a breakdown voltage varying within 750–800 V.

Quality of connecting layer 10 is checked by the infrared-microscopy method.

EXAMPLE 4

The method of the invention is illustrated by an example based on joining electrically conducting bodies in the form of rectangular plates 1 and 2 fabricated accordingly of molybdenum and silicon, with reference to FIGS. 1 and 2b.

Molybdenum plate 1, 0.5 mm thick, is ground, polished and annealed in hydrogen at a 800° C temperature for 30 min. As to the other dimensions of the plate under consideration they are similar to those of plate 1 of Example 3.

Next plate 1 is mounted on top of plate 2 of silicon with the n-type conductivity and a 1 ohm.cm specific resistance of the same dimensions as plate 2 of Example 3.

The connection process is accomplished by following the procedure described in Example 1 in vacuum at a residual pressure of $1 \cdot 10^{-7}$ mm Hg at a 900° C temperature and a 5 ampere current. As to the low-melting material 3, use is made of silumin.

Between molybdenum plate 1 and silicon plate 2 is formed crystallized connecting layer 10 (FIG. 2b) which consists of silicon alloyed with an aluminium addition.

Quality of the joint is checked with the aid of longitudinal and transverse microsections.

EXAMPLE 5

The method of the invention is expounded with an example in which is considered the process of connection of electrically conducting bodies in the form of rectangular plates 1 and 2 manufactured respectively of gallium arsenide and germanium. The process is effected by the technique described in Example 1 with reference to FIGS. 1 and 2b.

On top of germanium plate 2 with the p-type conductivty and a 1-ohm.cm specific resistance is set plate 1 made of gallium arsenide. The process is carried out in a hydrogen atmosphere at a 700° C temperature by passing a 15 ampere current with plates 1 and 2 being of the same dimensions as stated in Eample 1. As for low-melting material 3, use is made of gallium in the form of a ball 1 or globule mm in diameter.

The quality of the joint is checked with the aid of the infrared microscopy method.

EXAMPLE 6

The method of this invention is illustrated with an exemplary connection of electrically conducting bodies in the form of rectangular plates 1 and 2 produced respectively of indium antimonide and germanium, with reference to FIGS. 1 and 2b.

The process of connecting is effected by the method described in examples 1 and 5 at a 500° C temperature and a 15 ampere current.

As for low-melting material 3, use is made of indium in the form of a ball or globule 1 mm in diameter.

Quality of the joint produced is checked by the infrared microscopy method.

What is claimed is:

1. A method of connecting electrically conducting bodies using a low-melting material which is introduced into a gap between the bodies being joined and removed from said gap by means of a direct current, comprising:

bringing the bodies to be joined into contact;

bringing a portion of the low-melting material into contact with the end gap between said bodies to be connected;

bringing at least one of said bodies to be connected into contact with external electrodes so that the direction of the electric current passing through the body be parallel to the surface to be connected and be such as to cause movement of said low-melting material in its molten state from the end edges of said bodies into the gap between them;

placing the whole composition comprising the two bodies to be joined and the low melting material into the zone of action of an external heater;

placing said composition in a protective medium;

melting said low-melting material under the action of said external heater;

introducing the melt into said gap between the bodies by means of a first switching-on of a direct current;

a first switching-off of the direct current after the melt has been introduced into said gap;

increasing the temperature by means of said heater to a magnitude sufficient at least for dissolving a layer of material of at least one of said bodies being connected in a quantity slightly exceeding the thickness of the initial gap between said bodies;

reducing the temperature of the external heater to a magnitude slightly exceeding the melting point of said low-melting material;

a second switching-on of direct current of such intensity that the heat evolved upon passage of the current would not cause melting of said bodies being connected;

maintaining passage of the direct current for a time until said low-melting material will collect at one of the end surfaces of said gap between said bodies near the electrode;

a second switching-off of the direct current;

cooling said composition; and removing the end portion of said bodies being connected together with said low-melting material protruding from the end gap.

2. A method of connecting a silicon body to another body made of a material selected from the group consisting of silicon and molybdenum by means of aluminum, said method comprising:

bringing the bodies to be connected into contact;

bringing a weighed amount of aluminum into contact with the end gap between said bodies to be connected;

bringing at least one silicon body into contact with external electrodes so that the direction of the electric current passing through the body be parallel to the surface of connection and be such as to cause movement of said aluminum in its molten state from the end edge of said bodies to be connected into the gap between them towards the negative electrode;

placing the whole composition comprising the two bodies to be joined and the low melting material into the zone of action of an external heater;

placing said composition into a protective medium of vacuum with the pressure not exceeding $1 \times 10^{-7}$ torr;

melting said aluminum portion by the heat of said external heater;

introducing said molten aluminum into said gap between the bodies by means of a first switching-on of a direct current;

a first switching-off of the direct current after the melt has been introduced into said gap;

increasing the temperature by means of said heater to a magnitude sufficient for dissolving a layer of silicon in said molten aluminum to a thickness slightly exceeding the initial gap between said bodies to be connected;

reducing the temperature of the external heater to a magnitude slightly exceeding the temperature of complete solidification of the resulting aluminum-silicon eutectic alloy;

a second switching-on of the electric current of such intensity that the heat evolved upon passage of the current would not cause melting of said bodies being connected;

maintaining passage of the current for a time until said aluminum-silicon alloy will collect at the end gap between said bodies being connected near the negative electrode;

a second switching-off of the direct current;

cooling said composition; and removing the end portion of said bodies being connected together with said aluminum-silicon alloy protruding from the end gap.

3. A method of connecting a germanium body to another body made of a material selected from the group consisting of germanium and at least one material selected from the group of gallium arsenide, gallium antimonide, indium arsenide and indium antimonide by means of a low-melting material selected from the group consisting of indium, gallium and tin, said method comprising;

bringing the bodies to be connected into contact;

bringing a weighed portion of said low-melting material into contact with the end gap between said bodies being connected;

bringing at least one of said bodies being connected into contact with external electrodes so that the direction of the current passing through the body be parallel to the surface of connection and be such as to cause movement of said low-melting material in its molten state from the end edge of said bodies being connected into the gap between them towards the negative electrode;

placing the whole composition comprising the two bodies to be joined and the low melting material into the zone of action of an external heater;

placing said composition into a medium of dry hydrogen;

heating said composition by means of said heater to a temperature sufficient for melting said low-melting material and for reduction of oxides on the surface of said bodies being connected;

introducing the melt into said gap between the bodies by a first switching-on of a direct current;

a first switching-off of the direct current after the melt has been introduced into said gap;

increasing the temperature by means of said heater to a magnitude sufficient for dissolving a layer of material of at least one of said bodies being connected in an amount slightly exceeding the thickness of the initial gap between said bodies being connected;

reducing the temperature of the external heater to a magnitude slightly exceeding the melting point of said low-melting material;

a second switching-on of direct current of such intensity that the heat evolved upon passage of the current would not cause melting of said bodies being connected;

maintaining passage of the direct current for a time until said low melting material will collect at one of the end surfaces of said gap between said bodies being connected near the negative electrode;

a second switching-off of the direct current;

cooling said composition; and removing the end portion of said bodies being connected together with said low-melting material protruding from the end gap.

* * * * *